(12) United States Patent
Stantchev

(10) Patent No.: US 6,438,173 B1
(45) Date of Patent: Aug. 20, 2002

(54) MULTICARRIER TRANSMISSION SYSTEM FOR IRREGULAR TRANSMISSION OF DATA BLOCKS

(75) Inventor: Branimir Stantchev, Dresden (DE)

(73) Assignee: Infineon Technologies AG, Munich (DE)

(*) Notice: Subject to any disclaimer, the term of this patent is extended or adjusted under 35 U.S.C. 154(b) by 0 days.

(21) Appl. No.: 09/499,567

(22) Filed: Feb. 7, 2000

Related U.S. Application Data

(63) Continuation of application No. PCT/DE98/02219, filed on Aug. 3, 1998.

(30) Foreign Application Priority Data

Aug. 5, 1997 (DE) .......................... 197 33 825

(51) Int. Cl.[7] .......................... H04L 27/28; H04K 1/10; H04B 3/46; H04B 17/00
(52) U.S. Cl. ........................................ 375/260; 375/224
(58) Field of Search .................................. 375/260, 224

(56) References Cited

U.S. PATENT DOCUMENTS 4,152,649 A * 5/1979 Choquet ...................... 325/42
5,450,456 A * 9/1995 Muller ........................ 375/224
6,091,932 A * 7/2000 Langlais .................... 455/5.1

FOREIGN PATENT DOCUMENTS

GB 2 307 155 A 5/1997

OTHER PUBLICATIONS

Timothy M. Schmidl et al.: "Low Overhead, low Complexity [Burst] Synchronization for OFDM", XP 000625022.
Branimir Stantchev et al.: "Burst Synchronization For OFDM–Based Cellular Systems With Separate Signaling Channel", XP–002089525.
Magnus Sandell et al.: "Timing and Frequency Synchronization in OFDM Systems Using the Cyclic Prefix", Conference Proceedings, International Symposium on Synchronization, Essen, Germany, Dec. 1995, pp. 16–19.

* cited by examiner

Primary Examiner—Don N. Vo
Assistant Examiner—Tony Al-Beshrawi
(74) Attorney, Agent, or Firm—Laurence A. Greenberg; Werner H. Stemer; Ralph E. Locher

(57) ABSTRACT

The invention relates to a method for receiving a multicarrier signal, in particular for a single transmission of a data block. In which case a multicarrier test signal having a cyclic time layout is transmitted together with the data block, and the multicarrier test signal is used for combined measurement of a start of a first data symbol of a data block and of any carrier-frequency shift between a transmitter and a digital receiver. The digital receiver evaluates the multicarrier test signal by performing a sequence of test steps.

10 Claims, 7 Drawing Sheets

MULTICARRIER TRANSMISSION SYSTEM FOR IRREGULAR TRANSMISSION OF DATA BLOCKS

CROSS-REFERENCE TO RELATED APPLICATION

This is a continuation of copending International Application PCT/DE98/02219, filed Aug. 3, 1998, which designated the United States.

BACKGROUND OF THE INVENTION

Field of the Invention

The invention relates to a method and a configuration for determining a start of a first symbol and a carrier-frequency shift at a receiver end when a multicarrier signal containing a sequence of data symbols, which form a data block, is received once. The determination of the symbol start controls a symbol clock for demodulation of the individual symbols. The estimated value of the carrier-frequency shift is used as a manipulated variable for frequency correction in the receiver both during reception and during subsequent transmission of data signals. In this case, a test signal is transmitted from the transmission end at an uncertain time together with a data block, and is looked for and evaluated by a configuration at the receiver end. A design rule for test signals is specified, which allows the combined estimation of the start of the first data symbol and the carrier-frequency shift between the transmitter and receiver.

The invention is suitable for forward-acting digital synchronization of wire-free or wire-based receivers which process orthogonal frequency division multiplexing (OFDM) signals for transmission of individual data blocks, which are transmitted irregularly. The invention relates to the general case of single-shot synchronization, which can be carried out for each individual data block irrespective of preceding or future synchronization attempts. Its accuracy is suitable for high-rate OFDM signals, which may use higher-level modulation (for example 8-DPSK or 16-QAM) for high bandwidth efficiency. At present, OFDM is regarded as a suitable modulation technique for future broadband multimedia mobile radio systems and broadband wire-free networks.

Published, British Patent Application GB 2 307 155 A describes a synchronization method for OFDM, which uses guard intervals that are present in the signal.

The synchronization of OFDM signals has furthermore been dealt with, inter alia, in Published, European Patent Application No. 92113788.1, in a reference by F. Classen, titled "Systemkomponenten für eine terrestrische digitale mobile Breitbandübertragung" [System Components For A Terrestrial Digital Mobile Broadband Transmission], in a dissertation at the RWTH Aachen, Shaker Verlag, Aachen 1996 and in conference publications by M. Schmidl, D. Cox, titled "Low-Overhead, Low-Complexity [Burst] Synchronization For OFDM", Conference Proceedings, IEEE International Conference on Communications '96, pages 1301–1306, and by M. Sandell, J. Beek, P. Börjesson, titled "Timing And Frequency Synchronization In OFDM Systems Using The Cyclic Prefix", Conference Proceedings, International Symposium on Synchronization, Essen, Germany, December 1995, pages 16–19.

A number of previous works relating to the synchronization of OFDM receivers have proposed the transmission of a test signal of specific length at cyclic times, whose periodicity is evaluated by the receiver and is used to determine the start of a data block or of any carrier-frequency shift between the transmitter and receiver. Methods for this evaluation have been specified both for before and after the calculation of he fast fourier transformation (FFT) used for demodulation of FDM signals.

A disadvantage of the known methods and configurations is that they are each characterized by at least one of the below recited features. First, only a portion of the total synchronization of the receiver is dealt with, in which case the remaining synchronization tasks are presupposed to have been completed ideally; one example is the description of a method for estimation of the carrier-frequency shift, presupposing ideal symbol-clock synchronization. Second, regular repetition of test signals for receiver synchronization is stipulated, and/or averages over a plurality of synchronization sequences and test signals are required for adequate synchronization accuracy. While this approach is advantageous for broadcast radio applications, it is impossible, or feasible only with great complexity, for irregular transmission of data blocks in two transmission directions the computation operations to be carried out per synchronization sequence do not have the aim of minimum hardware processing complexity.

OFDM is a multicarrier modulation method. The transmitted OFDM signal s(t) in baseband includes a time sequence of individual OFDM symbol signals $g_i(t)$ of duration $T_S$:

$$s(t) = \sum_i g_i(t - iT_s) \text{ where} \quad (1)$$

$$g_i(t) = \sum_k S_{i,k} e^{j2\pi k F_\Delta t} b(t)$$

$$b(t) = \begin{cases} 1, & T_G \leq t \leq T \\ 0, & \text{else} \end{cases}$$

The summation index i represents the symbol clock, and k represents the subcarrier of the frequency $kF_\Delta$. The OFDM symbol signal $g_i(t)$ contains the superposition of M (for example M=49) subcarriers $e^{j2\pi F_\Delta t}$ which are modulated independently of one another by the complex data symbols $S_{i,k}$. The vector of all the symbols $S_{i,k}$ for a fixed symbol clock value i is referred to as the symbol block $s_i$. The superposition, also called modulation, is carried out digitally by an inverse fast fourier transformation (IFFT) of length $N_{FFT}$. $N_{FFT} > M$ where M input values of the IFFT are identical to $S_{i,k}$, and the remaining ($N_{FFT}-M$) input values are set to zero. The demodulation of the OFDM signal is carried out by an FFT of length $N_{FFT}$. The following parameters are also defined:

T—symbol duration used, $T_G$—guard interval, which is at least as long as the maximum channel echo, and $F_A$—subcarrier separation The relationships $T_S=T+T_G$ and $F_A=1/T$ apply. For practical applications, $T_G<0.25T_S$.

A data block contains a sequence of at least one OFDM symbol $g_i(t)$. This is provided with a test signal, which is positioned either in front of the data block or in the middle of the data block. In the former case, the test signal is referred to as a preamble, and in the second case as a midamble. In a practical implementation of a multicarrier transmission system, it can be stated, as a precondition, that: the time characteristics of the transmission channel are approximately constant for the duration of the test signal $2T_S$; and the frequency characteristics of the transmission channel are approximately constant for a frequency interval of at least $2F_A$.

SUMMARY OF THE INVENTION

It is accordingly an object of the invention to provide a method and a configuration for a combined measurement of the start of a data block and a carrier-frequency shift in a multi-carrier transmission system for irregular transmission of data blocks that overcome the above-mentioned disadvantages of the prior art methods and devices of this general type.

With the foregoing and other objects in view there is provided, in accordance with the invention, a method for receiving a multicarrier signal, including a single transmission of a data block, in which case a cyclic multicarrier test signal having a cyclic time layout is transmitted together with the data block, and the cyclic multicarrier test signal being used for a combined measurement of a start of a first data symbol of the data block and of any carrier-frequency shift between a transmitter and a digital receiver, the cyclic multicarrier test signal being evaluated in the digital receiver performing the steps which includes:

performing a coarse measurement of the start of the data block by evaluating the cyclic multicarrier test signal without any fast fourier transformation (FFT) being calculated in the step;

determining a fine carrier-frequency shift, which may be present between the transmitter and the digital receiver, by isolation and evaluation of a part of the cyclic multicarrier test signal without any FFT being calculated in the step;

performing isolation and digital frequency correction of $N_{FFT}$ sample values from the cyclic multicarrier test signal and calculation of an FFT of length $N_{FFT}$ from the sample values resulting in calculated FFT values;

performing isolation and phase correction of a test vector of length $M < N_{FFT}$ from the calculated FFT values resulting in a phase-corrected test vector;

calculating a further test vector of length $M-1$ by differential decoding of the phase-corrected test vector;

measuring any integer carrier-frequency shift which may be present between the transmitter and the digital receiver with a maximum value of $\theta$ subcarrier intervals, in terms of magnitude, by isolation of at least $L+2\theta$ values from the further test vector and by carrying out $2\theta+1$ correlations using a basic, known training sequence of length L;

performing a fine measurement of the start of the data block at least by correlation of the further test vector with a basic, known training sequence of maximum length $M-1$, which contains the known training sequence as a subsequence;

deriving an exact determination of the start of the first data symbol in the data block by addition of the start of the data block from the coarse measurement and a corrected value for the start of the data block from the fine measurement; and deriving an exact determination of a total carrier-frequency shift between the transmitter and the digital receiver by adding the integer carrier-frequency shift and the fine carrier-frequency shift.

The object of the invention is to specify a method which, controlled by a test signal which is transmitted once and taking into account minimum processing complexity, defines in a combined manner the precise start of the first data symbol and the carrier-frequency shift between the transmitter and receiver in a data block provided with the test signal.

According to the invention, the object is achieved by the receiver by monitoring the received signal and by the totality and sequence of method steps which specify the OFDM symbol clock for demodulation of the individual subcarrier symbols, drive digital frequency correction, and correct frequency synthesis in the radio-frequency section of the receiver.

An essential feature of the solution is that the multicarrier test signal having a cyclic time layout is transmitted with the data block. The multicarrier test signal is than evaluated in the receiver by a series of evaluation steps. It is then advantageous to transmit the single-carrier test signal before the multicarrier test signal, in order to use the single-carrier test signal to determine the start of the data block, additionally and with little processing complexity.

An essential feature of the solution is the optimum sequence relating all the method steps, in which the presence of parameters that are not yet known does not prevent the estimation of a parameter (time or frequency) in the respective step. Suitable isolation of test signals and test vectors results in no noise being caused by intersymbol interference (ISI) and subcarrier interference in the parameter estimation process.

A major advantage of the invention is the combined estimation of the symbol start and the frequency shift by a single synchronization sequence. The small number of computation operations for the synchronization sequence is advantageous, particularly the fact that only a single FFT is required for synchronization.

Another advantage of the invention is that, in the case of differential modulation on each individual subcarrier in the time domain, the FFT required for synchronization can be used, by use of subsequent phase correction for each usable subcarrier, to calculate the first OFDM reference symbol in the data block. Furthermore, after the phase correction, a channel estimate can be made in the frequency domain, which is used for coherent demodulation or for equalization of the subcarrier symbols in the frequency domain.

A major advantage of the invention for wire-free applications is the use of the single OFDM subcarrier, at times, for transmission of the single-carrier test signal. By narrowband filtering out of this test signal in a suitable manner and single-carrier operations, the receiver can determine the symbol clock and the start of the data block while saving power and with a small number of computation operations per unit time. This step is optional, and is particularly advantageous for start synchronization for mobile terminals, where time is not critical. It is assumed in this case that the OFDM module can be scaled appropriately for the single-carrier operating mode.

Other features which are considered as characteristic for the invention are set forth in the appended claims.

Although the invention is illustrated and described herein as embodied in a method and a configuration for a combined measurement of the start of a data block and a carrier-frequency shift in a multicarrier transmission system for irregular transmission of data blocks, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
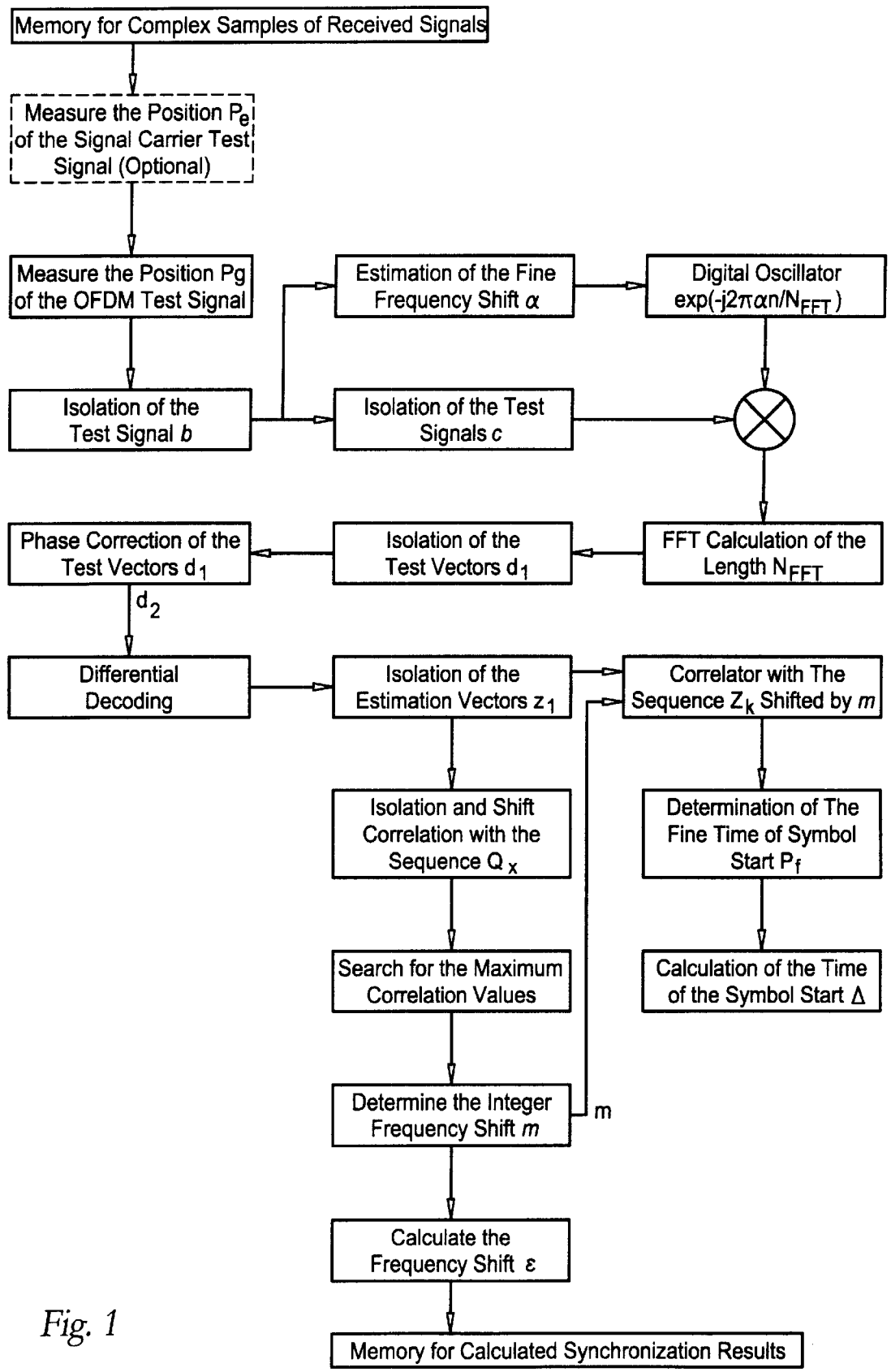
FIG. 1 is a flow chart of a processing sequence for synchronization according to the invention.

In all the figures of the drawing, sub-features and integral parts that correspond to one another bear the same reference symbol in each case. Referring now to the figures of the drawing in detail and first, particularly, to FIG. 1 thereof, there are shown individual process steps and their interrelationships of the method according to the invention. A set $I_M$ of inverse fast fourier transformation (IFFT) indices is defined, which contain the symbols $S_{i,k}$, $k \in I_M$ defined in equation (1):

$$I_M = \{N_{FFT} - (M - int(M/2) - 1), N_{FFT} - (M - int(M/2)), \ldots, N_{FFT} - 2, \\ N_{FFT} - 1, 0, 1, 2, \ldots, int(M/2) - 1, int(M/2)\} \quad (2)$$

where int(•) is the greatest integer number less than or equal to •. The first element of $I_M$ corresponds to a lowest frequency in a spectrum of a transmitted orthogonal frequency division multiplexing (OFDM) signal s(t).

An optional, coarse measurement of a start of a data block is carried out by use of a single-carrier test signal, in a first method step.

Figure 2:
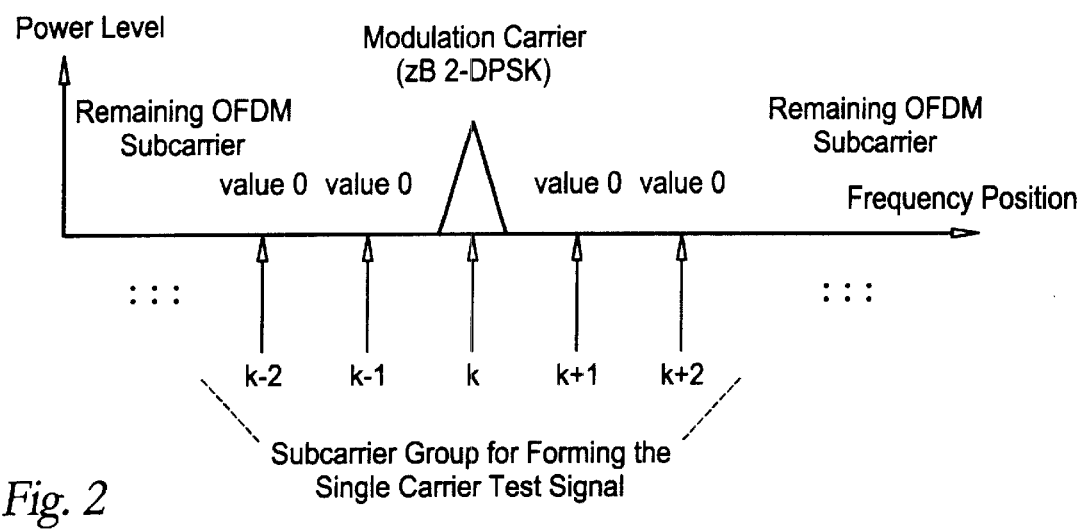
FIG. 2 is a graph showing a principle of production of a single-carrier test signal by a multicarrier transmission system.

The single-carrier test signal contains a modulated complex symbol sequence $C_{e,i}$, $i=0, \ldots L_e-1$ of length $L_e$ with good autocorrelation. A group of adjacent OFDM subcarriers is used to form the single-carrier test signal for the duration of at least $L_e$ OFDM symbols. At least one subcarrier from this group is in this case used for modulation of the symbol sequence $C_{e,i}$. The remaining subcarriers in this group are each set to zero, in order to form a guard band in the frequency domain from the rest of the OFDM signal. FIG. 2 shows the basic group structure. In the exemplary embodiment, a group of six adjacent subcarriers with IFFT indices 14, 15, 16, 17, 18, 19 from a 128-IFFT is considered. The keying of subcarriers 16 and 17 corresponds to 2-FSK modulation. One and only one of these subcarriers is set to zero in each OFDM signal, and the others are set to one of the complex symbols $C_{e,i}$. The subcarriers 14, 15, 18, 19 are each set to zero. The invention defines a time $t_A > 0$ that is known in the receiver and is between the possible transmission of the single-carrier test signal and the subsequent transmission of the multicarrier test signal.

The receiver first uses the single-carrier test signal to measure the symbol clock of the OFDM signal by continuous narrowband evaluation of the received OFDM subcarrier or subcarriers which is or are used for transmission of the sequence $C_{e,i}$. This is done using known methods, for example the early-late synchronization method in the case of 2-FSK. This is followed by a measurement of an arrival time $p_e$ of the symbol sequence $C_{e,i}$, by continuous correlation. The identification of this sequence at the time $p_e$ is an indication that the multicarrier test signal has arrived at the time $(p_e + t_A)$. The measurement and evaluation of the multicarrier test signal must then be carried out in a time window around this time. This approach according to the invention saves computation complexity in the synchronization sequence by use of the multicarrier test signal for determining the start of the data block, when the receiver has no prior knowledge whatsoever of the time reference.

A coarse measurement of the start of the data block is carried out by use of the multicarrier test signal (OFDM test signal) in a second method step.

Figure 3:
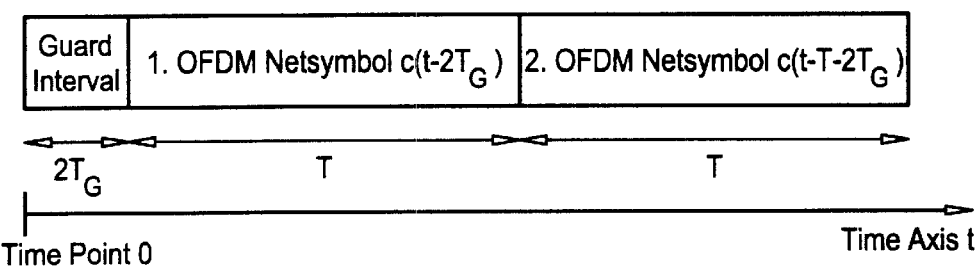
FIG. 3 is a schematic time layout of the multicarrier test signal.

The OFDM test signal a(t), $0 \leq t < 2T_S$, in baseband contains two cohesive identical signal forms c(t), $0 \leq t < T$, which are preceded by a common guard interval of duration $2T_G$. This double guard interval is equivalent to the signal section c(t) where $0 < T - 2T_G \leq t < T$. The time structure of the OFDM test signal is shown in FIG. 3. The signal c(t) is produced as follows:

$$c(t) = \sum_{k \in I_M} C_k e^{j2\pi F_\Delta t}, \quad 0 \leq t < T \quad (3)$$

and is calculated digitally by use of an IFFT from the symbol block $c_1 = (C_k | k \in I_M)$. $c_1$ contains a cyclically expanded, differentially coded, complex training sequence:

$$Q_k, k=0, \ldots, L-1 \quad (4)$$

with a constant amplitude and good cyclic autocorrelation characteristics. This is any desired sequence of finite length L whose cyclic autocorrelation for mutually shifted sequences has a low value in comparison to L (for example the value 1). For simple signal processing in the receiver, it is advantageous to use a binary sequence $Q_k$.

The sequence $Q_k$ is expanded cyclically on both sides by $\theta$ symbols, where $\theta$ defines the measurement range of the maximum magnitude of the carrier-frequency shift as an integer multiple of $F_\Delta$. This results in the sequence:

$$Q^{(Z)}_k = Q_{(k+L-\theta) \bmod L}, k=0, \ldots, L-1+2\theta \text{ where } L+2\theta \leq M-1 \quad (5)$$

To obtain relatively small amplitude fluctuations in the signal c(t), it is advantageous for $L+2\theta$ not to be very much greater than L, and not to be very much less than (M−1). It is feasible to choose $L+2\theta = (M-1)$. If $L+2\theta < (M-1)$ it is also advantageous to set the remaining $(M-1-L-2\theta)$ subcarriers from $I_M$ to any desired complex symbols of the same amplitude, so that the amplitude fluctuations of c(t) are small. This is particularly advantageous in order to avoid negative non-linearity effects on the transmission path. The following complex symbol sequence $X_k$, which is defined as required and is known in the receiver, of minimum length one is defined for this purpose:

$$X_k, k=0, \ldots, M_r-1 \text{ where } M_r = (M-L-2\theta) \quad (6).$$

Furthermore, a symbol sequence $Z_k$, $k=0, \ldots, M-2$ is formed as follows:

1st case: $(M-1) > L+2\theta$ $$Z_k = \begin{cases} X_{k-1}, & k = 0, \ldots, ((M_r-1)/2)-1 \\ Q^{(z)}_{k-int((M_r-1)/2)}, & k = int((M_r-1)/2), \ldots, M-2-\text{round}((M_r-1)/2) \\ X_{k+1-M+M_r}, & k = M-\text{round}((M_r-1)/2)-1, \ldots, M-2 \end{cases} \quad (7)$$

2nd case: $(M-1) = L+2\theta$ $$Z_k = Q_k^{(z)}, k=0, \ldots, M-2 \quad (8)$$

where round(•) denotes the smallest integer number greater than or equal to •.

A symbol sequence $D_k$, $k=0, \ldots, M-1$ is formed by differential coding of $Z_k$:

$$D_k = \begin{cases} X_0, & k = 0 \\ D_{k-1}Z_{k-1}, & k = 1, \ldots, M-1. \end{cases} \quad (9)$$

The symbols $D_k$, $k=0, \ldots, M-1$ are mapped onto the subcarrier symbols $C_k$, $k \in I_M$. This mapping is carried out using the relationship:

$$C_{[k]} = D_k, k=0, \ldots, M-1 \quad (10)$$

[•] in this case denotes the element from $I_M$ with the position •.

A binary sequence $Q_k$ of the length L=35 for a number of subcarriers M=49 and a maximum integer carrier-frequency shift with a magnitude of $\theta=4$ is used in the exemplary embodiment. A possible symbol sequence $Z_k$ before differential coding is shown in the following table, based on equations (5) and (7).

| K | 0 | 1 | 2 | 3 | 4 | 5 | 6* | 7 | 8 | 9 | 10 | 11 | 12 |
|---|---|---|---|---|---|---|---|---|---|---|---|---|---|
| $Z_k$ | $X_1$ | $X_2$ | 1 | -1 | 1 | -1 | 1 | 1 | 1 | 1 | -1 | 1 | 1 |
| K | 13 | 14 | 15 | 16 | 17 | 18 | 19 | 20 | 21 | 22 | 23 | 24 | 25 |
| $Z_k$ | -1 | -1 | -1 | 1 | -1 | -1 | -1 | -1 | -1 | 1 | 1 | 1 | -1 |
| K | 26 | 27 | 28 | 29 | 30 | 31 | 32 | 33 | 34 | 35 | 37 | 38 | 39 |
| $Z_k$ | -1 | -1 | 1 | -1 | 1 | 1 | -1 | 1 | 1 | -1 | 1 | -1 | 1 |
| K | | | | | K | 40* | 41 | 42 | 43 | 44 | 45 | 46 | 47 |
| | | | | | $Z_k$ | -1 | 1 | 1 | 1 | 1 | $X_3$ | $X_4$ | $X_5$ |

*denotes the limits of the corresponding sequence $Q_k$, where $M_r = 6$.
The symbols $X_k$, $k = 0, \ldots, 5$ are optimized, for example by computer simulation, to minimize the time fluctuations in the magnitude of the OFDM test signal.

The coarse determination of the start of a data block by use of the multicarrier test signal is based on the fact that, if the multicarrier test signal is received at time zero, the received signal $a_1(t)$ contains an ISI element for $0 \leq t < T_G$ and an ISI-free element for $T_G \leq t < 2T_S$. From here on, it is assumed that $T_G$ is represented by G, and T is represented by N samples in the digital receiver.

A correlation metric is obtained by cross-correlation over N complex samples between two signal sections received without any gap and of total duration 2N. This correlation metric is recalculated for each arriving sample. A virtually constant metric value is obtained for a time interval over at least G samples. If the correlation metric is calculated continuously, the start of the data block is determined roughly within these G samples. A position $p_g$ is in this case output for that sample as the result for which the correlation metric is a minimum or maximum of all the calculated metric values within a search window of known duration. The value p. is used as a coarse estimate of the time of the multicarrier test signal in the receiver. Since this test signal has a known length, $p_g$ also determines the coarse start of the first symbol of the data block. The determination of the start of the data block is refined in method step 7.

In the exemplary embodiment, a running metric which is known from one of the stated sources is calculated from the stored complex samples of the received signal r(l) for each sample time n within a time window $[n_1, n_2]$:

$$\text{Metric}(n) = \sum_{l=0}^{N-1}(|r(n-1)|^2 + |r(n-1-N)|^2) - 2\left|\sum_{l=0}^{N-1} r(n-1)r*(n-1-N)\right|,$$

$$n \in [n_1, n_2]$$

The value $p_g$ is obtained from:

$$p_g = \min_{n \in [n_1, n_2]}(\text{Metric}(n))$$

on the assumption that a received signal is actually present (no transmission pause). $p_e$ represents, for example, a memory address. As an alternative to this, a suboptimum metric may be used according to the invention, although this can be implemented highly efficiently in computation terms:

$$\text{Metric}(n) = \left|\sum_{l=0}^{N-1} r(n-1)r*(n-1-N)\right|^2, \; p_g = \max_{n \in [n_1, n_2]}(\text{Metric}(n)). \quad (11)$$

In combination with gain control in the receiver (GC), this metric is also highly suitable for transmission pauses in the search window.

Isolation of a test signal and estimation of the fine carrier-frequency shift, that is to say the carrier-frequency shift whose magnitude is less than half the subcarrier separation, is carried out in a third method step.

Once the value $p_g$ is available, the following signal element is isolated from the recognized, received, digital multicarrier test signal $a_1(n)$:

$$b(n) = a_1(n+p_g+\delta) \text{ for } n=0, \ldots, 2N-1 \quad (12).$$

$\delta$ is an integer number, which additionally defines the position of the vector b(n), and can also be set to zero. This processing sequence is illustrated in a simplified form in FIG. 4. The isolation according to the invention of b(n) has the advantage that there is a high probability that b(n) will not contain any samples with ISI elements. It is also advantageous that, even if a few samples of b(n) contain ISI noise, it is nevertheless possible to determine a very accurate estimated value for the fine frequency shift.

The estimated value $\alpha$ of the fine carrier-frequency shift is obtained by calculation over $2K \leq 2N$ samples of the signal b(n). A method for this purpose that is known from the stated sources is:

$$\alpha = \frac{1}{2\pi}\tan^{-1}\left(\frac{Im\left(\sum_{n=0}^{K-1} b*(n)b(n+N)\right)}{Re\sum_{n=0}^{K-1} b*(n)b(n+N)}\right), \quad (13)$$

Re-real part, Im-imaginary part

The relationship $\alpha = f_V/F_\Delta$, where $f_V$ is the absolute carrier-frequency shift in Hz. The carrier-frequency shift is calculated, normalized to the subcarrier separation, as the result. The sum is advantageously present in the numerator and denominator of equation (13) in the second method step as well.

Digital frequency correction of the fine carrier-frequency shift, and calculation of an FFT are carried out in a fourth method step.

The estimated value $\alpha$ in this case controls a digital oscillator which produces the signal $e^{-j2\pi\alpha n/N_{FFT}}$, $n=0, \ldots, N_{FFT}-1$. $N_{FFT}$ is the FFT length for the demodulation of the OFDM signal. $N=rN_{FFT}$ where r is a positive integer number, which represents the oversampling factor in the receiver.

A further signal is then isolated from the signal element b(n):

$$c(n)=b(m+\gamma), n=0, \ldots, N_{FFT}-1, \quad (14).$$

Figure 4:
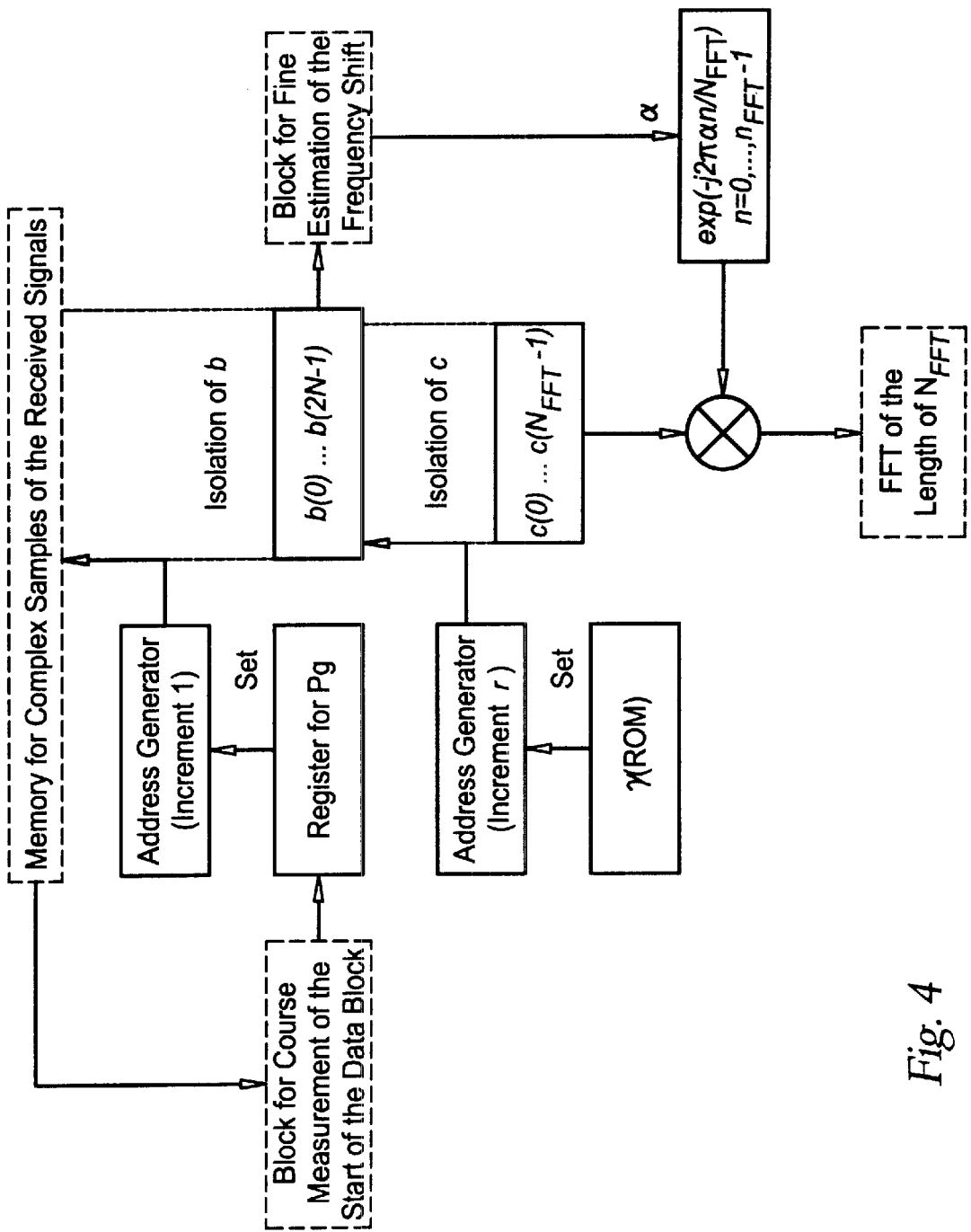
FIG. 4 is a flow chart of the processing sequence relating to an isolation of a FFT input vector and a digital frequency correction of a fine carrier-frequency shift.

$\gamma$ any desired number where $G<\gamma<N$,

This processing sequence is shown in FIG. 4. It is advantageous to use $\gamma=N/2$. Thanks to the time shift $\gamma$, the signal c(n) contains only samples from $a_1(n)$ without ISI elements.

The signal c(n) is multiplied by the signal produced by the digital oscillator, and is supplied to the FFT building block. An $N_{FFT}$-FFT is then calculated. This processing sequence is shown in simplified form in FIG. 4. The FFT supplies the values $C^1_k$. An advantage of the invention is that, because of the frequency correction using the digital oscillator, the FFT values $C^1_k$ do not contain any noise caused by subcarrier interference, and this is particularly advantageous for further synchronization sequences.

Isolation and phase correction of a test vector from the FFT values are carried out in a fifth method step.

The values $C^1_k$ differ from the FFT values which would have been calculated from the first received OFDM net symbol (FIG. 3) of the OFDM test signal at the right time only by a phase shift through $(\psi_k+2\pi\gamma k/N_{FFT})$, where $\psi_k$ is the phase error due to the inaccuracy of the estimate $p_g$. Only M values $C^1_k$ are required, namely those with indices from $I_M$. These M FFT values are isolated, in order to obtain the vector $d_1$ with the elements $D^1_k$:

$$d_1=(D^1_k|k=0, \ldots, M-1)=(C^1_k|k\in I_M) \quad (15).$$

Figure 5:
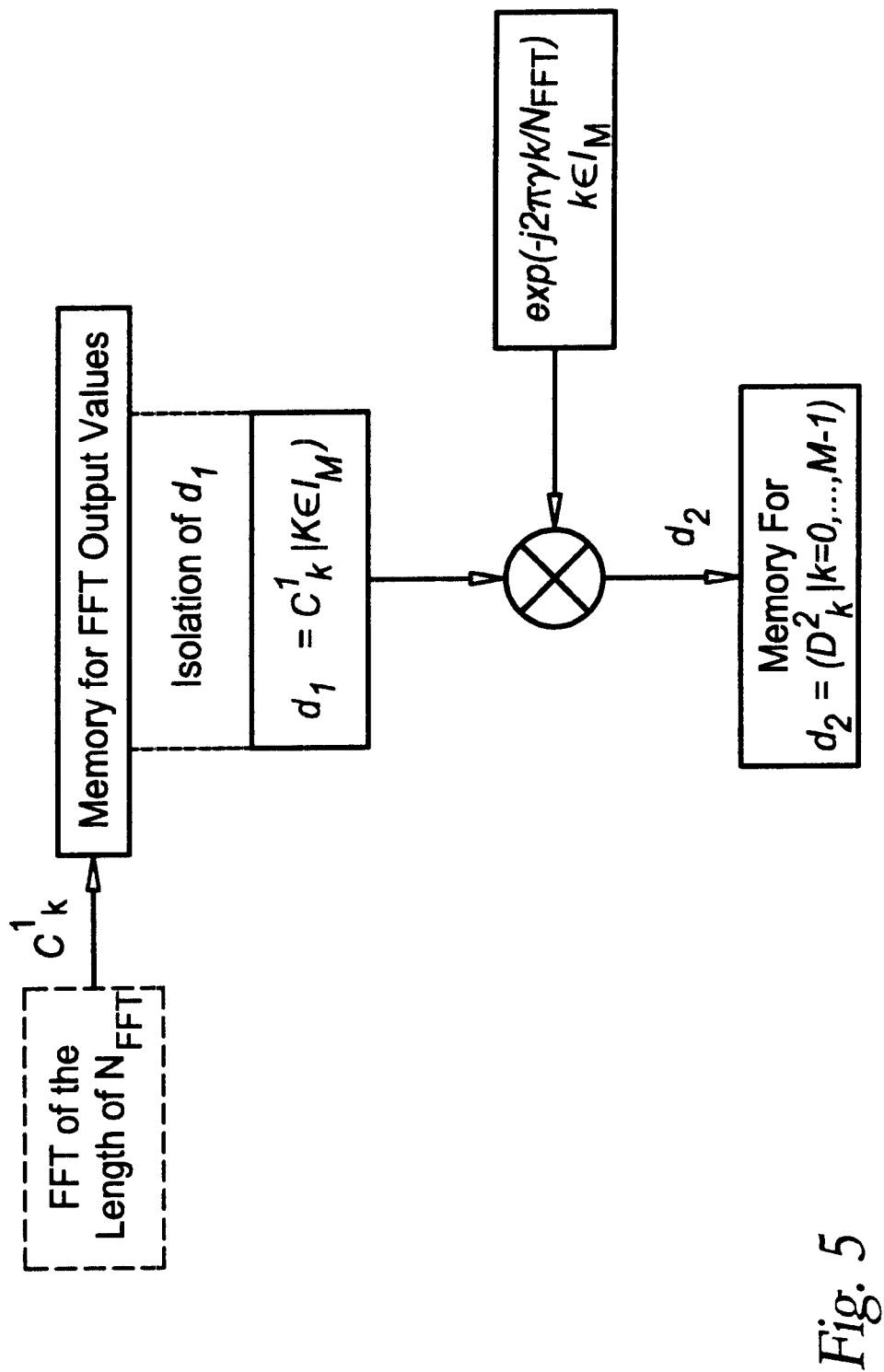
FIG. 5 is a flow chart of the processing sequence for the isolation and phase correction of a test vector from FFT values.

This processing sequence is shown in FIG. 5. For the further synchronization sequences, it is advantageous to eliminate the phase error $2\pi\gamma k/N_{FFT}$ in the symbols $C^1_k$. Each of these symbols is therefore multiplied by $e^{-j2\pi\gamma k/N_{FFT}}$. This results in the phase-corrected vector $d_2$ with the elements $D^2_k$:

$$d_2=(D^2_k|k=0, \ldots, M-1)=(C^1_k e^{-j2\pi\gamma k/N_{FFT}}|k\in I_M) \quad (16).$$

This processing sequence is also shown in FIG. 5. If $\gamma=N/2$ is chosen according to the invention, then this advantageously results in the simple multiplication:

$$d_2=(C^1_k(-1)^k|k\in I_M).$$

Isolation of a test vector and estimation of the integer carrier-frequency shift, that is to say the carrier-frequency shift which is a multiple of the magnitude of the subcarrier separation, are carried out in a sixth method step.

An estimated vector $z_1$, containing the complex symbol sequence $Z^1_k$, is in this case formed by the differential decoding of $D^2_k$:

$$z_1=(Z^1_k=conj(D^2_k)D^2_{k+1}|k=0, \ldots, M-2) \quad (17)$$

where conj(•) denotes the complex-conjugate value of •.

The position of the training sequence $Q_k$ is now looked for in the estimated vector, in order to estimate the integer carrier-frequency shift. Without any integer frequency shift, its start $k_0$ occurs at:

$$k_0=int((M_r-1)/2)+2\theta \quad (18).$$

The solution according to the invention determines the integer carrier-frequency shift between the transmitter and the receiver by calculating $(2\theta+1)$ correlations $M_i$, $i=-\theta, -\theta+1, \ldots, \theta-1, \theta$ using the following method:

$$M_i = \sum_{l=0}^{L-1} Z^1_{l+k_0+i} conj(Q_l), i = -, \ldots, . \quad (19)$$

The integer frequency shift m is set to be equal to the value i, which corresponds to the maximum correlation magnitude $|M_i|$:

$$m = \max_{i\in[-\theta,\theta]}(|M_i|) \quad (20)$$

Figure 6:
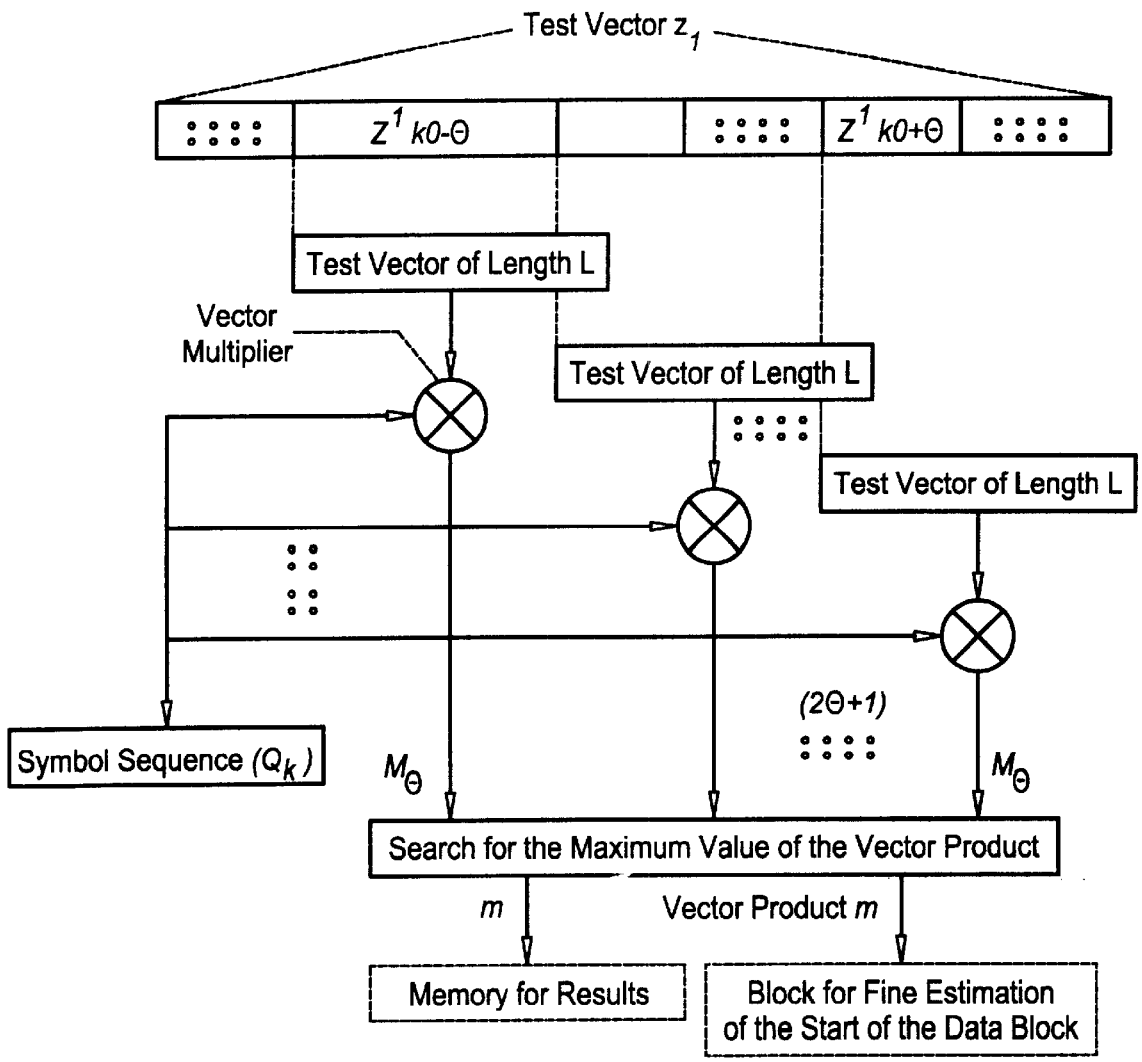
FIG. 6 is a flow chart of the processing sequence for determining a integer carrier-frequency shift between a transmitter and a receiver.

This processing sequence is shown in FIG. 6.

Isolation of a test vector and estimation of the remaining time shift to the correct start of the data block, that is to say fine estimation of the start of the OFDM data block, are carried out in a seventh method step. The fine estimation of the symbol start of the first data symbol according to the invention is carried out, based on knowledge of m, using the method:

$$p_f = \frac{N_{FFT}}{2}\tan^{-1}\left(\frac{Im\left(\sum_{l=0}^{M-2} Z^1_{l+m} conj(Z_l)\right)}{Re\left(\sum_{l=0}^{M-2} Z^1_{l+m} conj(Z_l)\right)}\right), \quad (21)$$

where $Z^1_k = 0$ for $k < 0$ and $k > (M-2)$.

The approach for this processing sequence is shown in FIG. 6. The estimate $p_f$ has a small inaccuracy $\lambda>0$, which is dependent on the channel and is compensated for by appropriate lengthening of the guard interval $T_G$ at the transmission end.

The start of the first OFDM data symbol is calculated from the results of steps 2 and 7, in an eighth method step.

The exact start $\Delta$ of the first OFDM symbol of the received data block is obtained, according to the invention, by the corrected addition of $p_g$ and $p_f$:

$$\Delta=p_g+r(p_f+2N_{FFT}-\lambda) \quad (22)$$

where int($\Delta$) is used as an address in the memory for complex samples of the received signal, and points to the exact position of the first sample of the first data symbol in the data block. The value Δ may also be used as a control variable for controlling the sampling clock of the analog/digital converter in the receiver.

The carrier-frequency shift between the transmitter and receiver is calculated, using the results from steps 3 and 6, in a ninth method step.

The entire carrier-frequency shift ε, normalized to the subcarrier separation, between the transmitter and receiver is obtained, according to the invention, by the addition of m and α:

$$\epsilon = m + \alpha \quad (23)$$

This estimated value is used for digital frequency correction or follow-up control of the frequency synthesis in the receiver.

Figure 7:
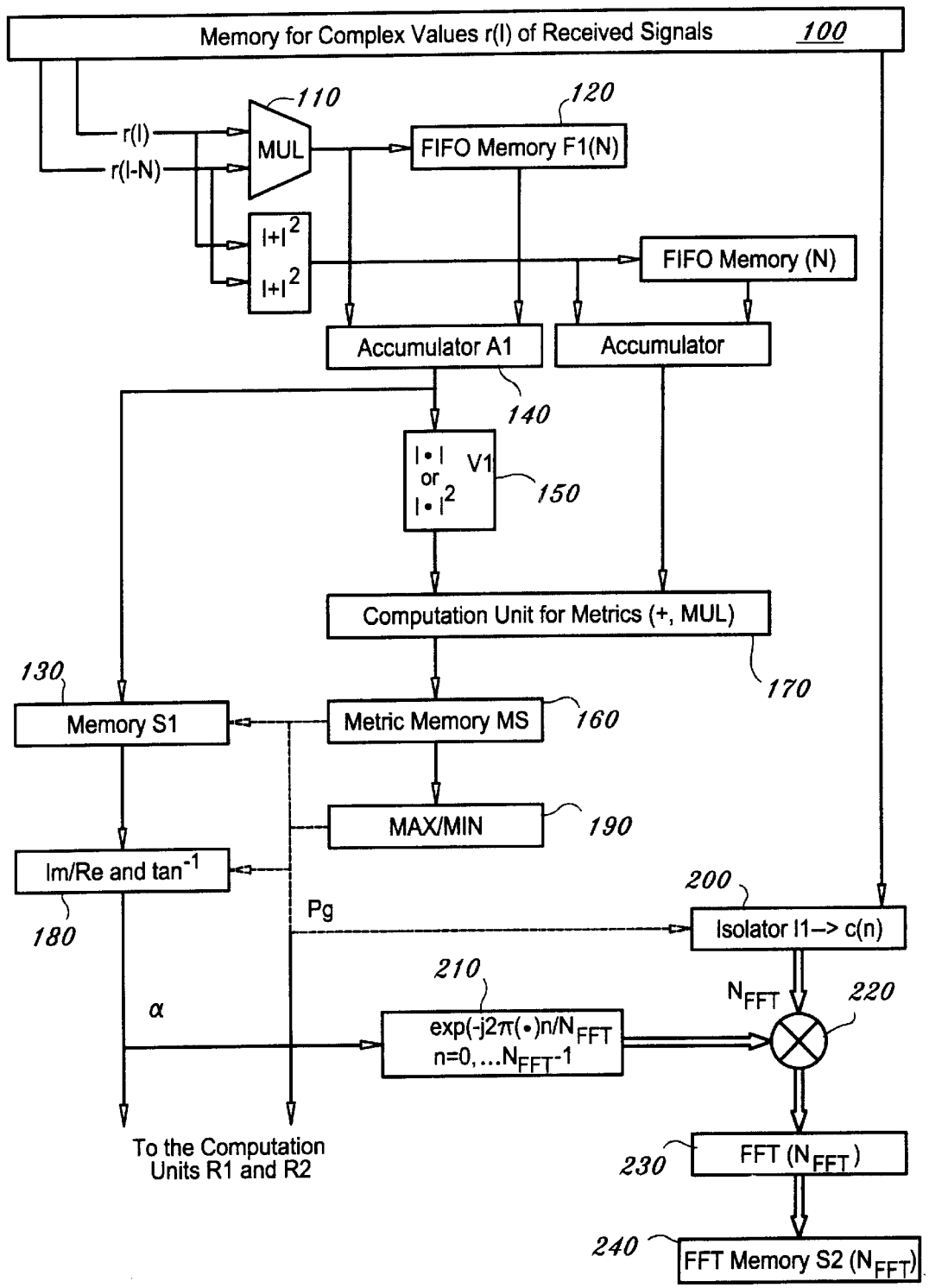
FIG. 7 is a block diagram of a circuit configuration for carrying out the entire processing sequence according to the invention.
Figure 7:
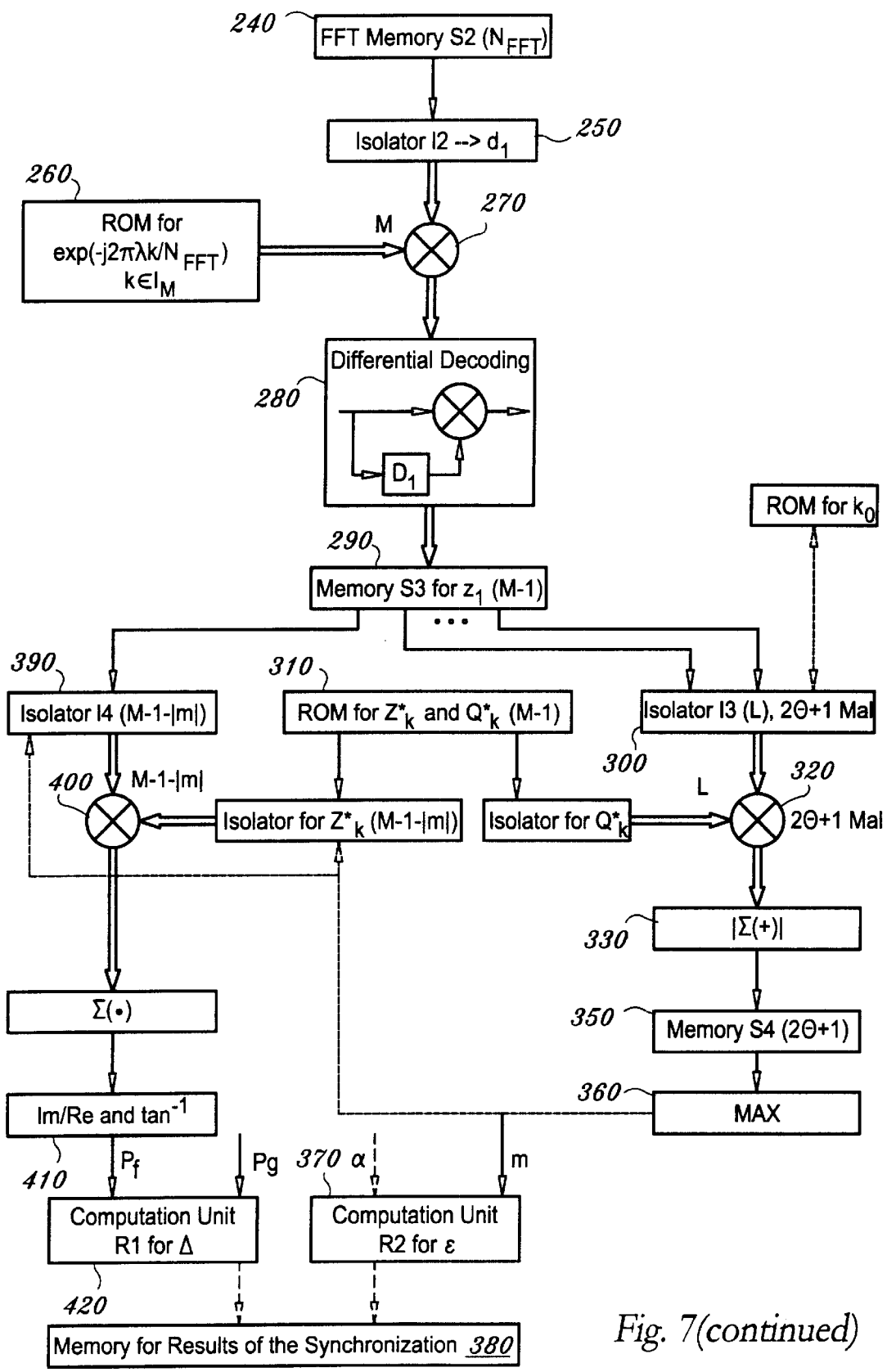

The entire processing sequence according to the invention is shown, together with the sequence of the individual method steps, in FIG. 1. The corresponding configuration is shown in FIG. 7. A memory 100 is provided for storing complex sample values r(l), r(l–N) of received signals. A multiplier 110 receives the two complex samples r(l) and r(l–N) of a received signal and stores the multiplication results in at least one first-in first out (FIFO) memory 120. An accumulator 140 receives input values from an input and a negated output of the at least one FIFO memory 120 and writes calculated results to a first memory 130. A first apparatus 150 for performing root calculations and calculations of a square of a magnitude is connected to the accumulator 140. A computation unit 170 for calculating metrics for time synchronization is provided and receives input values from at least the first apparatus 150 and writes calculated metrics to a metric memory 160. A second apparatus 180 for calculating a $\tan^{-1}$ of a value is connected to the first memory 130. A third apparatus 190 for searching for a maximum and a minimum value is connected to the metric memory 160. The third apparatus 190 provides addressing data to the first memory 130 and controls the second apparatus 180. A first isolator 200 is connected to the third apparatus 190 and receives a test signal. A fourth apparatus 210 performs digital frequency synthesis functions and receives values from the second apparatus 180. The fourth apparatus 210 generates and outputs values. A fifth apparatus 220 for vector multiplication of the test signal received from the first isolator 200 and from the values output by the fourth apparatus 210. A FFT apparatus 230 receives input values from the fifth apparatus 220 and outputs FFT values. A second memory 240 receives and stores the FFT values.

A second isolator 250 is connected to the second memory 240 and generates a test vector. A sixth apparatus 270 for vector multiplication of the test vector of the second isolator 250 by an output of a first read only memory 260 is provided. A seventh apparatus 280 for differential decoding is connected to the sixth apparatus 270 and outputs differentially decoded results.

A third memory 290 receives the results from the seventh apparatus 280. A third isolator 300 is connected to the third memory 290 and has an output outputting results, the third isolator 300 prepares test vectors for correlations with a training sequence $Q_k$. A second read only memory 310 outputs a training sequence conj $Z_k$ and the training vector $Q_k$ containing values conj $Q_k$. An eighth apparatus 320 performs vector multiplication and is connected to the output of the third isolator 300. The eighth apparatus vector multiplies the training vector containing the values conj $Q_k$ by the results outputted by the third isolator 300 and generates calculated values. A ninth apparatus 330 performs magnitude formations and receives the calculated values and generates norm values from the calculated values. A fourth memory 350 stores the norm values from the ninth apparatus 330. A tenth apparatus 360 searches for a maximum value and is connected to the fourth memory 350. A first computation unit 370 calculates an exact carrier-frequency shift ε and is connected to the tenth apparatus 360. The first computation unit contains at least one real multiplier with a constant as well as one real adder. A fifth memory 380 is connected to the first computation unit 370 for storing the exact carrier-frequency shift ε. A fourth isolator 390 is connected to the third memory 290 and outputs a test vector. An eleventh apparatus 400, controlled by a calculated integer carrier-frequency shift for vector multiplication, is connected to the fourth isolator 290 and to the second read only memory 310 supplying the training sequence conj $Z_k$. The eleventh apparatus 400 generates a calculated vector being added up element-by-element. A twelfth apparatus 410 for calculating a $\tan^{-1}$ is connected to the eleventh apparatus 400 and receives the calculated vector from the eleventh apparatus 400. A second computation unit 420 calculates an exact position Δ of the first data symbol of the data block, the second computation unit is connected to the twelfth apparatus 410 and to the fifth memory 380. The second computation unit contains at least one real multiplier with a constant as well as one real adder.

I claim:

1. A method for receiving a multicarrier signal, including a single transmission of a data block, in which case a cyclic multicarrier test signal having a cyclic time layout is transmitted together with the datablock, and the cyclic multicarrier test signal being used for a combined measurement of a start of a first data symbol of the data block and of any carrier-frequency shift between a transmitter and a digital receiver, the cyclic multicarrier test signal being evaluated in the digital receiver performing the steps which comprises:

performing a coarse measurement of the start of the data block by evaluating the cyclic multicarrier test signal without any fast fourier transformation (FFT) being calculated in the step;

determining a fine carrier-frequency shift, present between the transmitter and the digital receiver, by isolation and evaluation of a part of the cyclic multicarrier test signal without any FFT being calculated in the step;

performing isolation and digital frequency correction of $N_{FFT}$ sample values from the cyclic multicarrier test signal and calculation of an FFT of length $N_{FFT}$ from the sample values resulting in calculated FFT values;

performing isolation and phase correction of a test vector $d_1$ of length $M < N_{FFT}$ from the calculated FFT values resulting in a phase-corrected test vector $d_1$;

calculating a further test vector $z_1$ of length M−1 by differential decoding of the phase-corrected test vector $d_1$;

measuring any integer carrier-frequency shift present between the transmitter and the digital receiver with a maximum value of θ subcarrier intervals, in terms of magnitude, by isolation of at least L+2θ values from the further test vector $z_1$ and by carrying out 2θ+1 correlations using a basic, known training sequence $Q_k$ of length L;

performing a fine measurement of the start of the data block at least by correlation of the further test vector $z_1$ with a basic, known training sequence of maximum length M−1, which contains the known training sequence $Q_k$ as a subsequence;

deriving an exact determination of the start of the first data symbol in the data block by addition of the start of the data block from the coarse measurement and a corrected value for the start of the data block from the fine measurement; and deriving an exact determination of a total carrier-frequency shift between the transmitter and the digital receiver by adding the integer carrier-frequency shift and the fine carrier-frequency shift.

2. The method according to claim 1, which comprises carrying out the coarse measurement of the start of the data block by evaluation of a single-carrier test signal, in which case the single-carrier test signal is transmitted before the multicarrier test signal, with a time interval $t\Delta$ which is known in the digital receiver.

3. The method according to claim 2, which comprises producing the single-carrier test signal via a group of adjacent subcarriers of a multicarrier transmission system, in which case at least one subcarrier in the group is used for transmission of a complex symbol sequence which is known in the digital receiver and has a finite length, and other subcarriers of the group are set to zero, for a purpose of frequency separation.

4. The method according to claim 1, which comprises assigning the multicarrier test signal a symbol block $c_1$ with a length M of differentially coded symbols, so that in a cohesive section the symbol block $c_1$ contains the training sequence $Q_k$ which is expanded cyclically on both sides of constant amplitude with the length L and very good cyclic autocorrelation, the length L of cyclic expansion on each side of the training sequence $Q_k$ is equal at least to the integer carrier-frequency shift having a greatest possible magnitude between the transmitter and the digital receiver, the symbol block $c_1$ further having a further training sequence containing any required symbols of a same constant amplitude, which are bounded on both sides by the training sequence $Q_k$ that has been cyclically expanded.

5. The method according to claim 4, which comprises producing the multicarrier test signal by the steps of:

processing the symbol block $c_1$ via an inverse fast fourier transformation (IFFT) resulting in an IFFT output vector;

continuing the IFFT output vector by cyclic repetition to twice a length resulting in a cyclic signal; and providing the cyclic signal with a guard interval as a prefix, in which the guard interval represents a copy of an end part of the cyclic signal and is twice as long as the guard interval in each data symbol of the multicarrier transmission system.

6. The method according to claim 4, which comprises carrying out the step of measuring the integer carrier-frequency shift between the transmitter and the digital receiver after calculating the FFT and by the following steps:

isolating a vector section of the length L from the further test vector $z_1$ and multiplying it element-by-element by the training sequence $Q_k$ for each of the $2\theta+1$ correlations, an element of the vector section for a first correlation is in a position $k_0-\theta$, where $k_0$ corresponds to a position of a first symbol of the training sequence $Q_k$ in the symbol block $c_1$ of the multicarrier test signal, and isolated vector sections of two successive correlations each overlap by L−1 elements;

determining from calculated $2\theta+1$ correlation results, a correlation result having a maximum magnitude; and using an integer discrepancy of $k_0$ from an initial position of the vector section which supplies the correlation result having the maximum magnitude to determine an integer carrier frequency offset.

7. The method according to claim 4, which comprises carrying out the fine measurement of the start of the data block after the calculation of the FFT, by correlation of the further test vector $z_1$ with the symbol block $c_1$ which is shifted through a possibly defined integer shift, is differentially decoded and then has a complex-conjugate taken, and by calculation of an angle of a correlation result obtained in this way.

8. The method according to claim 7, which comprises lengthening a guard interval required in each symbol signal of the multicarrier transmission system at a transmission end at least by an inaccuracy of the fine measurement of the start of the data block.

9. The method according to claim 1, which comprises calculating a metric for each sample of a received signal within a finite number of samples, and, after reception of all samples, a maximum of all calculated metrics is used for the coarse measurement of the start of the data block.

10. A configuration for determining a start of a first data symbol of a data block of a multicarrier signal, comprising:

at least one first-in-first-out (FIFO) memory having an input and a negated output;

a multiplier receiving two complex samples of a received signal and connected to said at least one FIFO memory;

a first memory;

an accumulator receiving input values from said input and said negated output of said at least one FIFO memory and writing calculated results to said first memory;

a first apparatus for root calculation and calculation of a square of a magnitude being connected to said accumulator;

a metric memory;

a computation unit for calculating metrics for time synchronization and receives input values from at least said first apparatus and writes calculated metrics to said metric memory;

a second apparatus for calculating a $\tan^{-1}$ of a value and connected to said first memory;

a third apparatus for searching for a maximum and a minimum value and connected to said metric memory, said third apparatus providing addressing data to said first memory and controls said second apparatus;

a first isolator connected to said third apparatus and receiving a test signal;

a fourth apparatus performing digital frequency synthesis functions and receiving values from said second apparatus, said fourth apparatus generating and outputting values;

a fifth apparatus for vector multiplication of the test signal from said first isolator and the values output by said fourth apparatus;

a FFT apparatus receiving input values from said fifth apparatus and outputting FFT values;

a second memory receiving the FFT values;

a second isolator connected to said second memory and generating a test vector;

a first read only memory generating an output;

a sixth apparatus for vector multiplication of the test vector of said second isolator by the output of said first read only memory;

a seventh apparatus for differential decoding connected to said sixth apparatus and outputting results;

a third memory receiving the results from said seventh apparatus;

a third isolator connected to said third memory and having an output outputting results, said third isolator preparing test vectors for correlations with a training sequence $Q_k$;

a second read only memory outputting a training sequence conj $Z_k$ and the training vector $Q_k$ containing values conj $Q_k$;

an eighth apparatus performing vector multiplication and connected to said output of said third isolator, said eighth apparatus vector multiplying the training vector containing the values conj $Q_k$ by the results outputted by said third isolator and generating calculated values;

a ninth apparatus for performing magnitude formations receiving said calculated values and generating norm values from the calculated values;

a fourth memory storing said norm values from said ninth apparatus;

a tenth apparatus for searching for a maximum value and connected to said fourth memory;

a first computation unit for calculating an exact carrier-frequency shift $\epsilon$ connected to said tenth apparatus, said first computation unit contains at least one real multiplier with a constant and one real adder;

a fifth memory connected to said first computation unit for storing the exact carrier-frequency shift $\epsilon$;

a fourth isolator connected to said third memory and outputting a test vector;

an eleventh apparatus, controlled by a calculated integer carrier-frequency shift for vector multiplication, being connected to said fourth isolator and to said second read only memory supplying the training sequence conj $Z_k$, said eleventh apparatus generating a calculated vector being added up element-by-element;

a twelfth apparatus for calculating a $\tan^{-1}$ connected to said eleventh apparatus and receiving the calculated vector from said eleventh apparatus and having an output; and a second computation unit for calculating an exact position of the first data symbol of the data block, said second computation unit connected to said twelfth apparatus and to said fifth memory, said second computation unit containing at least one real multiplier with a constant and one real adder.

* * * * *